Figure 1:
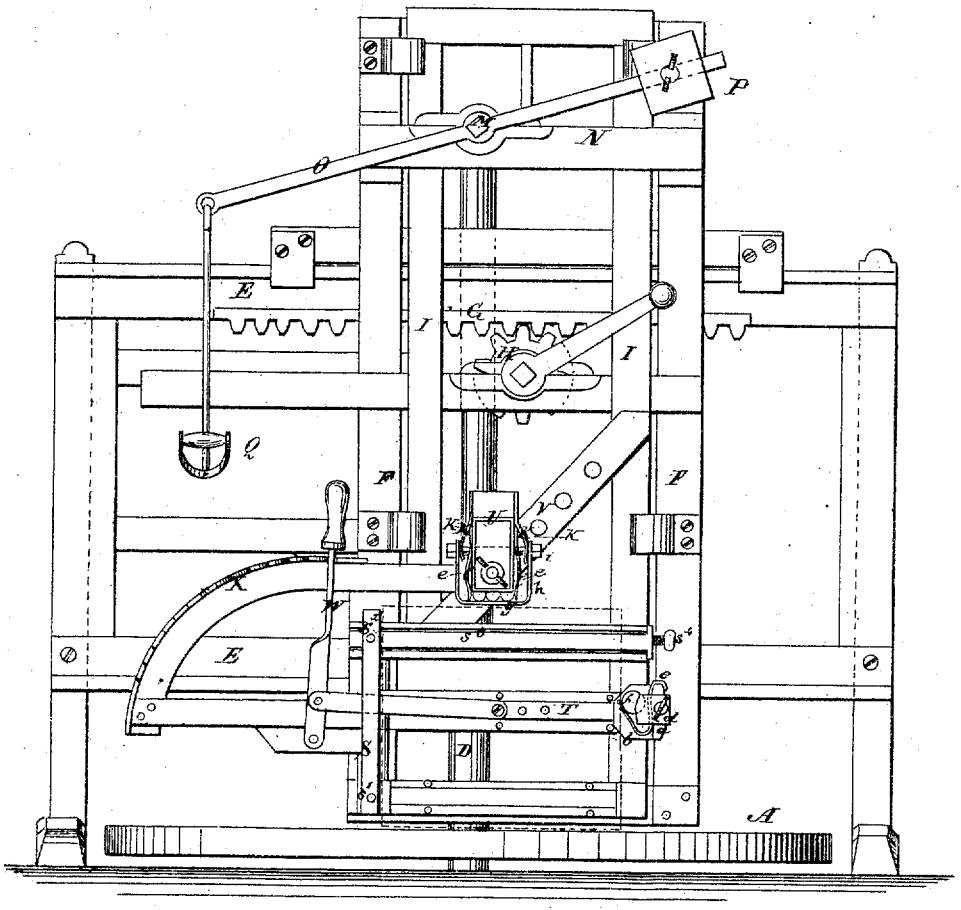

2 Sheets--Sheet 1.

G. BARNEY & V. G. BARNEY.

Machine for Dressing Tiles.

No. 5,468. Reissued July 1, 1873.

Witnesses:
Chas. Nida
C. Sedgwick

Inventor:
G. Barney
V. G. Barney
PER
Munn & Co.
Attorneys

AM. PHOTO-LITHOGRAPHIC CO. N.Y. (OSBORNE'S PROCESS.)

2 Sheets--Sheet 2.
G. BARNEY & V. G. BARNEY.
Machine for Dressing Tiles.
No. 5,468. Reissued July 1, 1873.
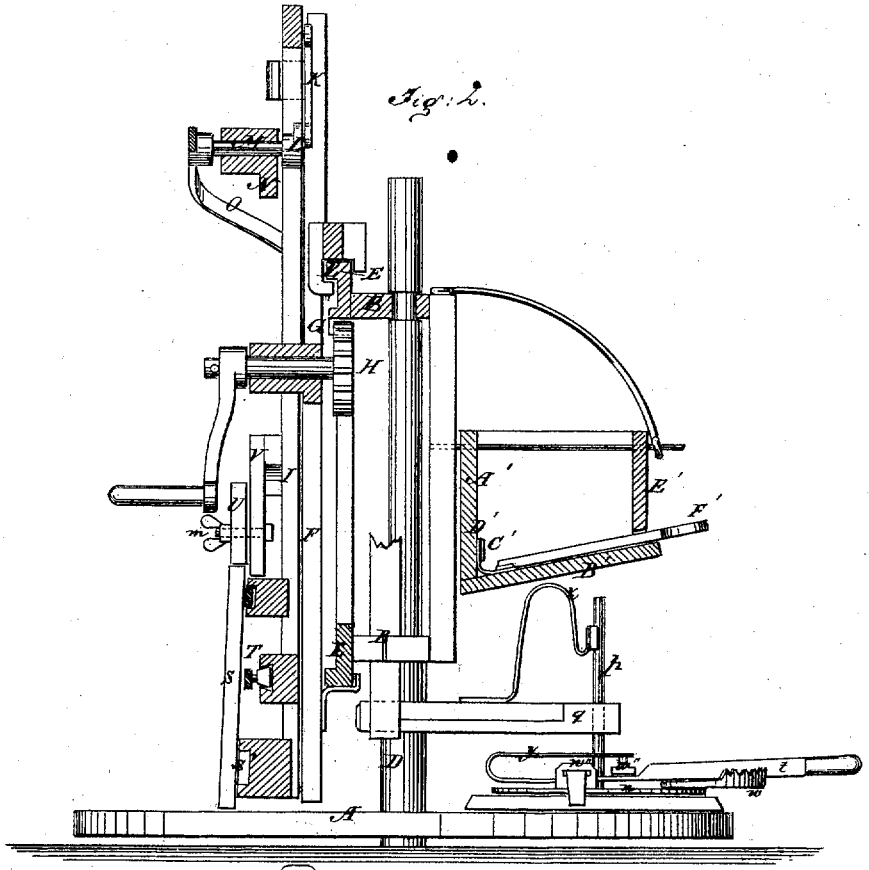
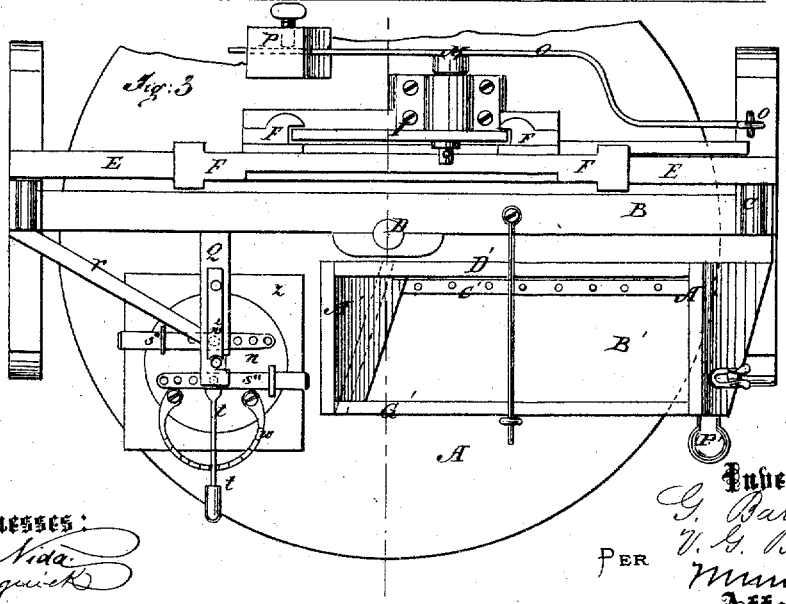
Witnesses:
Chas. Nida
Seiguiet
Inventor:
G. Barney
V. G. Barney
Per
Munn & Co.
Attorneys.
AM. PHOTO-LITHOGRAPHIC CO. N.Y. (OSBORNE'S PROCESS.)

UNITED STATES PATENT OFFICE

GEORGE BARNEY, OF SWANTON, VERMONT, AND VALENTINE G. BARNEY, OF CHARLES CITY, IOWA.

IMPROVEMENT IN MACHINES FOR DRESSING TILES.

Specification forming part of Letters Patent No. 107,435, dated September 20, 1870; reissue No. 5,468, dated July 1, 1873; application filed March 15, 1873.

*To all whom it may concern:*

Be it known that we, GEORGE BARNEY, of Swanton, in the county of Franklin and State of Vermont, and VALENTINE G. BARNEY, of Charles City, in the county of Floyd and State of Iowa, have invented a new and useful Improvement in Machines for Dressing Tiles, of which the following is a specification:

This invention relates to improvements in that class of machines for squaring and facing floor-tile in which a squaring-frame is arranged above a horizontal revolving dressing disk; and it consists in an improved arrangement of apparatus for holding the tile upon the disk for facing; and also improvements in sand and water feeding apparatus, and other features, all substantially as hereinafter described.

Figure 1 represents a front elevation of a machine embodying our improvement. Fig. 2 represents a sectional elevation perpendicular to the plane of Fig. 1; and Fig. 3 represents a top view of the same.

Similar letters of reference indicate corresponding parts.

A represents a horizontal rotating dressing-disk, such as is commonly used. Over this we arrange the transverse bars B, on posts C or other suitable supports. The vertical axle D of the disk A is supported on these bars. They also support ways E, on which we arrange the vertical frame F, which holds the tile to slide back and forth across the upper face of the disk, the said frame being moved by a toothed rack, G, on one of the ways E, and a pinion, H, and hand-crank mounted on the frame F. I is another vertical frame, which is mounted in supports attached to frame F, so as to have liberty to move up and down thereon. It is connected by a link, K, to a crank, L, attached to a shaft, M, supported in a cross-bar, N, of frame F, and attached to a lever, O, carrying an adjustable weight, P, at one end, and at the other a pendent handle, Q, for moving it to turn the shaft M, and raise or lower the frame I. The frame I carries at the bottom and on one side a clamping-bar, S, and opposite to it a movable clamp, attached to a sliding bar, T, for clamping the two opposite edges of the tile to be dressed, so that the lower edge will rest on the disk A. This bar S is pivoted at $S^1$ and jointed at $S^2$ to a bar, $S^3$, made adjustable back and forth by a screw, $S^4$, for adjusting the bar S perpendicular with the disk A, so that the tile clamped against bar S will be squared. The frame I carries a trussing-block, U, attached adjustably to the diagonal bar V on said frame, and intended to apply more or less of the weight of the frame I to the stone. The frame I is raised by pulling the lever O down at the end having the handle Q, for applying the stone, together with the weight P, which is adjustable to regulate the pressure. This frame I is to be provided with a screw or other adjustable stop to arrest it when the stone is ground off to the requisite size. The stone, being clamped edgewise, as shown in dotted lines in Fig. 1, is moved back and forth over the disk by the crank, pinion, and rack, before described, while the disk rotates under it and turns off the edge perpendicular to the vertical bar S. The clamp on the end of the bar T is composed of the angle-plate *a b*, the plate *d*, hook-shaped spring *e*, and roller *f*. The roller is placed in front of the plate *a*, to be pressed against the edge of the stone to roll up or down, to allow the stone to be tilted, when the edge against the vertical bar S is brought up parallel with it. The spring *e* is employed to hold the roller, and the plate *d* is used to hold the roller and spring against the plate *b*, to prevent them from becoming displaced. The bar T is moved by a springing hand-lever, W, which works over a ratchet-bar, X, and engages therewith to clamp the stone. This bar is made in two parts, and jointed so as to be extended or contracted for stone of different sizes. The presser-block U is provided with small friction-rollers *g*, in a recess in the lower end, and with a yoke, *h*, passing under the rollers, holding them in the recess. This yoke is suspended from a bolt, *i*, in such a way that it may move a short distance laterally thereon, and is provided with springs *k*, which, when not in contact with the tile, hold it so that the vertical bars are at about equal distances from the block. *l* represents springs, placed on two sides of the block, between it and the springs *k*, calculated to bring the rollers back to the center when moved either way therefrom. This block is attached to the diagonal bar V by a bolt, *m*, and thumb-nut, so as to be adjusted along the bar from place to place for stones of different sizes, and it is employed to apply the weight of the frame I, or a part thereof, to the top of the stone.

The function of the yoke and the rollers is to move with the stone whereon the yoke rests when the edge is brought up against the vertical bar S by the clamp at the opposite side, to admit of the ready adjustment of the stone. The springs *k* throw the yoke back again afterward, and the springs *l* restore the rollers to the required position.

For holding the face of the tile on the disk for dressing it we employ the holding-disk *n*, having a vertical spindle, *p*, mounted in the arm *q*, projecting from the lower beam B, and supported by a brace, *r*, or other suitable means. This disk is provided with the two clamping-bars *s''*, clamping-bar or hand-lever *t*, and ratchet-bar *w*, for taking hold of the tile.

In order to adjust the clamping-bars *s''* for stones of different sizes they are provided with a number of holes, and are connected to the lever *r* by pins $w^2$ thereon rising up to a spring, Y, which is a continuation of the hand-lever *t*, and is arranged to hold the bars *s''* on the pins, and to be readily raised up for connecting and disconnecting them in shifting for different sizes.

The spindle *p* is provided with another support, *z*, above the arm *q*, and revolves in its supports by the action of the disk on the stone, which, being thus rotated while subjected to the action of the disk, has a much smoother and more true and uniform surface imparted to it than when the polishing or dressing disk moves on the stone in the same course throughout the operation, as is now the common practice.

A′ represents the sand-feeding trough suspended from the side of the frame B C. It has a bottom, B′, hinged by a leather or other continuous hinge at C′ to the rear side D′, which is lower than the front E′. This bottom which, therefore, descends toward the rear, is attached so as to be supported higher or lower at the front, to make the descent more or less. One end of the trough is also higher than the other, and at the high end the bottom is provided with a small trough, P′, for conveying water upon the bottom at the high end. The bottom, which projects slightly beyond the end of the trough at the lower end, has a cross-bar, G′, shown dotted, to turn the water so as to discharge upon the disk A near the shaft D. This trough is loaded with sand on the bottom and against the side D′, leaving a margin of the bottom along the front edge uncovered, so that the water, entering at the spout P′, will flow along the edge of the bank of sand, and carry therefrom a small regular stream of sand onto the disk, the said regularity being due to the oblique bottom which keeps the stream of water against the edge of the bank of sand.

Having thus described our invention, we claim as new and desire to secure by Letters Patent—

1. In a tile-dressing machine, the combination of an adjustable weight with a frame having an up-and-down movement, and containing a mechanism for clutching the tile edgewise, substantially as described.

2. The combination, with the rotary grinding-disk A, of the horizontally-moving frame F, and the vertically-moving frame I, the frames F and I being arranged for holding the tile to be acted upon by the disk, all substantially as specified.

3. The combination, with the frame I, of the shaft M, crank L, link K, and weighted lever O, arranged for moving the frame I vertically, substantially as specified.

4. The combination, with the vertical holder S on the frame I, of a clamping-bar, T, and clamping-head, and a presser, the clamping-head and presser being provided with friction-rollers to admit of the adjustment of the stone when being clamped up to the vertical support S, substantially as specified.

5. The arrangement of the bar S for adjustment at its upper end relatively with the bed A, substantially in the manner described.

6. The arrangement of the presser U for adjustment on the diagonal bar V, substantially as specified.

7. The combination, with the angle-plate *a b*, of the roller *f* and spring *e*, substantially as specified.

8. The combination, with the bar T made adjustable as to length, and with the angle-plate *a b*, of the roller *f*, spring *e*, and plate *d*, substantially as specified.

9. The combination, with the block U, of the roller *g*, substantially as specified.

10. The combination, with the rollers *g* and block U, of the yoke *h*, springs *k* and *l*, all substantially as specified.

11. The combination, with the disk A, of the disk *n*, spindle *p*, clamping-bars *s''*, spring-handle *t*, and ratchet-bar *w*, substantially as specified.

12. The adjustable connection of the clamping-bars *s''* with the lever *t*, by means of the pins $w^2$ and the spring *y*, substantially as specified.

13. The feeding-trough A′ having the adjustable oblique hinged bottom and water-trough, all arranged for operation substantially as specified.

GEORGE BARNEY.
VALENTINE G. BARNEY.

Witnesses for GEORGE BARNEY:
WM. L. SOWLES,
G. W. BEEBE.

Witnesses for V. G. BARNEY:
H. C. BALDWIN,
J. H. WARREN.